United States Patent [19]

Sieben et al.

[11] Patent Number: 5,021,246

[45] Date of Patent: Jun. 4, 1991

[54] STEP MASHING PROCESS FOR PRODUCING LOW ALCOHOL BEER

[75] Inventors: Roger L. Sieben, Webster Groves; Klaus D. Zastrow, St. Louis County, both of Mo.

[73] Assignee: Anheuser-Busch, Incorporated, St. Louis, Mo.

[21] Appl. No.: 716,989

[22] Filed: Mar. 28, 1985

Related U.S. Application Data

[63] Continuation-in-part of Ser. No. 595,315, Mar. 30, 1984, abandoned.

[51] Int. Cl.$^5$ ............... C12C 7/00/7/04; C12C 11/00
[52] U.S. Cl. ........................................ 426/13; 424/16; 424/29; 435/93
[58] Field of Search ...................... 426/13; 424/14, 16, 424/29; 435/93

[56] References Cited

U.S. PATENT DOCUMENTS

| | | | |
|---|---|---|---|
| 613,915 | 11/1898 | Uhlmann | 426/14 |
| 721,383 | 2/1903 | Nilson | 426/14 |
| 3,852,495 | 12/1974 | Schimpf et al. | 426/14 |
| 4,272,552 | 6/1981 | Zastrow | 426/29 |
| 4,622,224 | 11/1986 | Owades | 426/16 |

OTHER PUBLICATIONS

Rose, A. H. Economic Microbiology, vol. 1, Alcoholic Beverages, Academic Press, N.Y. 1977, pp. 62–69.

Primary Examiner—David M. Naff
Attorney, Agent, or Firm—Gravely, Lieder & Woodruff

[57] ABSTRACT

A low alcohol reduced calorie beer is produced by a mashing technique wherein a main mash at a temperature below the activity range for beta-amylase is added incrementally to a brewing liquid at a temperature above the deactivation temperature of beta-amylase and below the deactivation temperature of alpha-amylase at a rate such that the added main mash is substantially instantaneously raised to the temperature of the brewing liquid. This mashing technique limits the conversion of starches by beta-amylase and other enzymes without significant loss of alpha-amylase from overheating to produce a wort having a low real degree of fermentation of from about 40% to about 46%. The main mash has a temperature of about 95° F. to 120° F., and the brewing liquid has a temperature of about 169° F. to 174° F. and can be water or a cooker mash that has been boiled and cooled. Beer can be produced having less than 2% alcohol by weight and less than about 118 calories per 12 ounce serving.

25 Claims, 1 Drawing Sheet

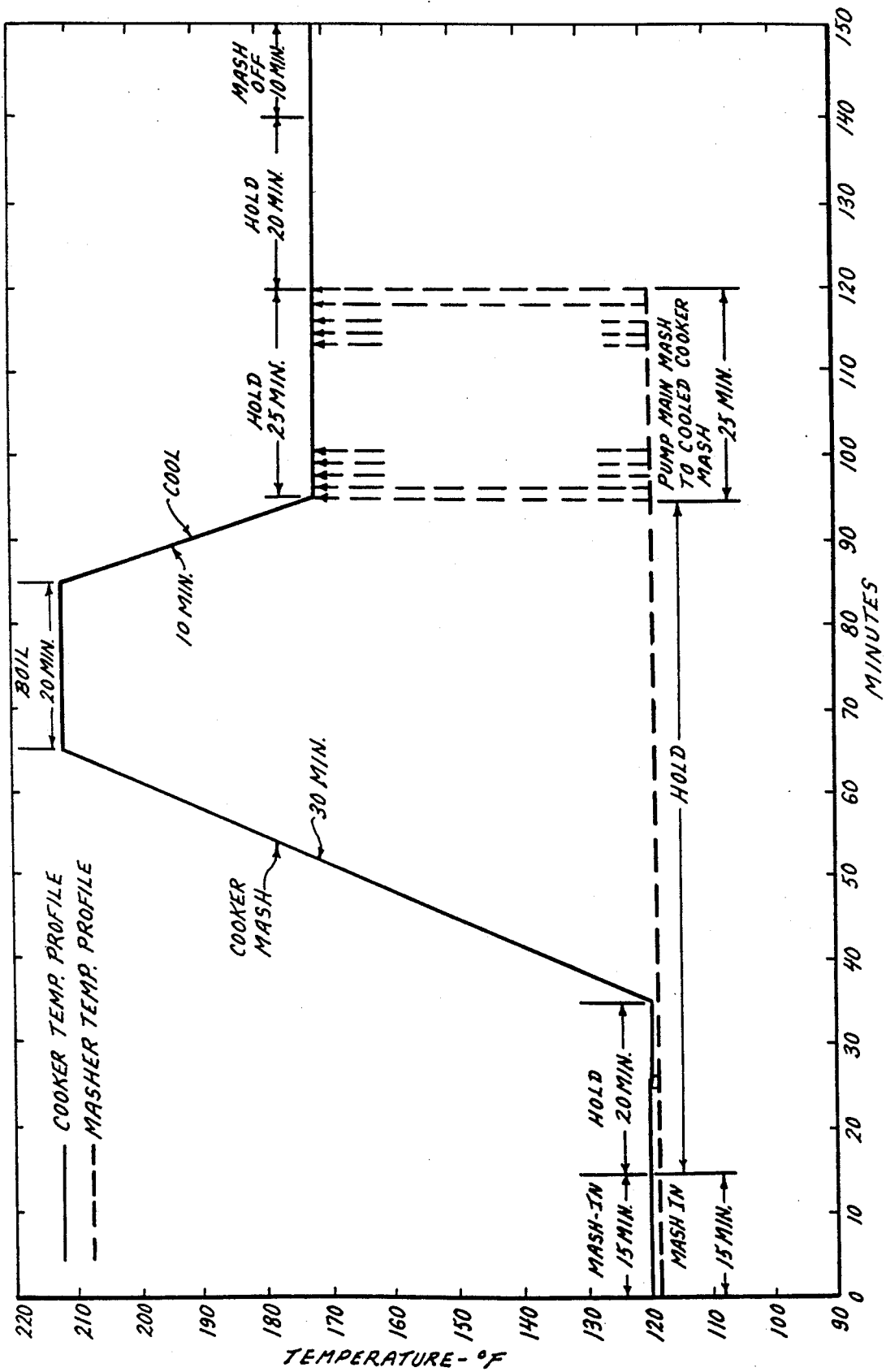

STEP MASHING PROCESS FOR PRODUCING LOW ALCOHOL BEER

REFERENCE TO THE PRIOR APPLICATION

This application is related to, contains subject matter in common with, and is a continuation-in-part of Ser. No. 595,315 filed Mar. 30, 1984, now abandoned entitled LOW ALCOHOL BEER PROCESS.

BACKGROUND OF THE INVENTION

This invention relates to a process for brewing, in conventional brewing plants using standard equipment and natural ingredients, a beer of reduced alcohol and calorie content, i.e., less than about 2% alcohol by weight, and having the taste, aroma, mouth feel, appearance, and foam stability of beer of higher alcohol content.

Beers of reduced alcohol content have been proposed in the patent and other literature. A number of processes are briefly surveyed in an article by M. W. Brenner entitled "Beers for the Future" published in the MBAA Technical Quarterly, Vol. 17, No. 4, 1980.

In the patent literature are noted Schimpf (U.S. Pat. No. 3,852,495) who makes a low alcohol beer by a double fermentation with removal of alcohol produced in the first fermentation before initiating the second fermentation.

Uhlmann (U.S. Pat. No. 613,915) utilizes a 170–175° F. mash to favor formation of dextrins over maltose, and then evaporates alcohol after fermentation. To renew the beer flavor, kraeusen is added to the product remaining after boiling.

Nilson (U.S. Pat. No. 721,383) mashes the malt at 100° F., removes the liquor containing the diastase, mixes the hot cooker mash into the remainder of the malt mash to raise the temperature of the malt mash rapidly to 176° F. with added steam, and adds the liquor back to reduce the mash temperature to 162° F. to produce a wort of low sugar content.

In a series of U.S. patents to Heuser U.S. Pat. Nos. 1,275,254, 1,290,191 and 1,455,397, the author shows beers of low alcohol content and condensed beers which can be diluted to drinking consistency.

There is known in the brewing art a technique of mashing known as "Springmaischverfahren" or jump-mashing, which was developed by Windisch around 1905 in Berlin. It involves a low malt mash temperature of 95–110° F. and pumpover of the malt mash into water at 212° F. to arrive at a conversion temperature of 169° F. which is maintained with added heat. This process will produce a low alcohol beer, but there is considerable killing of alpha-amylase enzyme (over 50%) before the temperature reaches 169° F. with resultant slow starch conversion, turbid wort, unacceptable beer flavor, and a real degree of fermentation (RDF) of below 40%.

Accordingly, it is a principal object of this invention to provide a method of making a completely attenuated low alcohol beer which has less than 2% alcohol by weight and a calorie content in the range of "light beers" while retaining all of the taste, aroma, foam, stability, mouth feel and appearance characteristics of conventional beer.

It is a further object to make such low alcohol beer using standard brewing equipment and all natural ingredients.

It is still a further object to provide a process for making low alcohol beer using a unique mashing technique which we call "Step mashing" in which the protein rest, and cooker mash-in temperature can be varied without adversely affecting the final product and in which the malt mash is pumped incrementally into a cooker mash which already has been cooled to the desired conversion temperature, thus instantaneously raising the temperature of each malt mash particle addition above the beta-amylase activity range while avoiding substantial heat destruction of the alpha-amylase enzymes in the malt mash. Fermentation is pursued until full attenuation (complete yeast fermentation) is reached and nowhere in the process is any alcohol removed, e.g., by vacuum distillation or reverse osmosis.

Still another object is to provide a Step mashing technique in which only water is in the cooker which is maintained at a temperature of about 169–174° F. in place of a cooker mash and the main mash is pumped into the hot water to raise the temperature of the main mash addition above the beta-amylase activity range substantially instantaneously and then rapidly to the temperature of the cooker water for conversion.

These and other objects and advantages will become apparent hereinafter.

SUMMARY OF THE INVENTION

The present invention comprises a process of making a low alcohol beer by a Step mashing process in which the cooker mash is cooled to the final desired conversion temperature and the malt mash temperature is raised instantaneously to the conversion temperature. Proceeding in this manner both beta-amylase activity and substantial alpha-amylase inactivation are avoided, resulting in the desired low fermentability (RDF) of the wort.

DESCRIPTION OF THE DRAWING

The figure in the drawing is a diagrammatic representation of a typical Step mash process of this invention.

DETAILED DESCRIPTION

The figure shows a representation of the mash process of this invention. The initial mash-in of the malt and the simultaneous mash-in of adjunct, e.g., corn, rice, other adjunct grains, or other carbohydrate sources are essentially the same as in conventional brewing techniques. The malt and water are added to a mash tun in about 15 minutes and held a 115° F. Simultaneously malt and adjunct grains and water are added to make about a 35% malt and 65% adjunct cooker mash. The cooker mash is held for 20 minutes and then raised to boiling at 212° F. in a period of 30 minutes and boiled for about 10–30 minutes. Alternatively, a portion of the malt mash can be pumped over to form part of the cooker mash.

Thereafter, the cooker mash is cooled by the addition of cold brewing water, preferably water which has been carbon filtered. The cooling also can be done by a cooling jacket, coils, heat exchanger external to mashing vessel, etc. The cooker mash is cooled to about 172° F. which is above the temperature at which betaamylase is active and below the temperature at which alphaamylase is inactivated. This takes about 10 minutes. All the while the cooker mash has been heating, boiling, and cooling, the main malt mash has been maintained at about 115° F. which is below the temperature at which the malt amylases display major activity.

When the cooker mash arrives at about 172° F, the main mash is slowly and incrementally pumped into the cooker mash with agitation so as to instantaneously heat each particle of main mash to the temperature at which the cooker mash is holding. This also requires the addition of heat to the cooker mash. The rate of heating is a function of the efficiency of the heater, the amount of agitation, the spreading out effect of the added main mash, and the amount of main mash added per minute. The critical factor is to raise the temperature of each particle of the main mash, which contains beta and alpha-amylases, from 115° F. to above 160° F. as rapidly as possible to prevent formation of fermentable sugars resulting mainly from beta-amylase activity in that range, and also to rapidly raise the temperature of the malt mash further to the target temperature of 172° F. to avoid formation of fermentable sugars resulting from activity of other enzymes in the malt.

By cooling the cooker mash to 172° F. before any main mash is added, there is no significant loss of alphaamylase activity resulting from heating the main mash above 176° F. which is the temperature at which alpha-amylase is deactivated. This was the problem with the Springmaischverfahren process when malt mash was pumped directly into boiling water.

Alternatively, the cooker mash can be replaced with hot water only, in an all malt process. The hot cooker water is maintained at about 172° F. with heat and the main mash is pumped into the hot water to raise the temperature of the malt mash particles instantaneously above the activity range of beta-amylase and to the hot water temperature. The cooker is heated during pumpover so as to maintain about 172° F. at all times.

When the malt mash has been completely added to the cooker mash, a period of about 25 minutes, the mash is maintained at 172° F. for another 30 minutes to complete the conversion of starch to sugars and dextrins. When the Iodine test is negative, the mashing is completed. The wort has 40-46% RDF.

VARIABLES

There are a number of variables which influence the effectiveness of the process as previously discussed, and one of these is the effect of cooker mash-in temperature on the real degree of fermentation (RDF).

The cooker mash-in temperature can be varied between about 95° F. and 120° F. or above 160° F. without significantly affecting the RDF of the final wort or the alcohol content of the beer produced therefrom. The preferred cooker mash-in temperature is about 95° F-120° F.

The malt mash temperature is another variable and should be below about 120° F. to keep the RDF in the desired range of about 40-46%.

Using standard malts, the malt/adjunct ratio should be greater than 50/50 to keep the RDF in the desired range. Use of lower malt/adjunct ratio or malts of lower enzyme power require lower conversion temperatures, i.e., about 165-169° F.

TABLE 1

EFFECT OF CONVERSION TEMPERATURE

| Conversion Temperature | % RDF | Beer Blended to 1.8% Alcohol by Weight | |
|---|---|---|---|
| | | Degree Plato | Calorie Per 12 oz |
| 176° F. | 33.1 | 11.18 | 146 |
| 172° F. | 41.7 | 8.88 | 114 |
| 170° F. | 45.2 | 8.19 | 107 |

TABLE 1-continued

EFFECT OF CONVERSION TEMPERATURE

| Conversion Temperature | % RDF | Beer Blended to 1.8% Alcohol by Weight | |
|---|---|---|---|
| | | Degree Plato | Calorie Per 12 oz |
| 165° F. | 51.8 | 7.16 | 91 |

Table I shows that the conversion temperature should be between about 169-174° F. and preferably about 172° F. to keep the RDF, alcohol percent and calories in the desired range.

From the foregoing, the ratio of adjunct to malt is from 0 to about 50% by weight. The cooker mash-in temperature is from about 95° F. to about 120° F. or above 160° F. and the malt mash-in temperature is from about 95° F. to about ° F. The conversion temperature is from 169° F. to 174° F.

The wort has a RDF of 40-46% and the fermented and blended beer has an alcohol content of less than 2% by weight, about 108 to 118 cal./12oz, and about 8.0 to 8.8 original gravity (O.G.). The alcohol content of the beer presently should be at least 1.4% to give the other desirable characteristics of beer, particularly when using a natural brewing process, conventional standard equipment and when using natural ingredients.

EXAMPLE NO. 1

15,360 lbs of ground barley malt is mixed with 5,550 gal. of water at 95° F. in the mash tub. 35 minutes later, 7,680 lbs. of brewer's rice and 2,520 lbs. of ground barley malt are mixed with 4,920 gal. of water at 160° F. in a cooker. While the temperature in the mash tub remains at 95° F, the cooker mash is brought to boil and boiled for 15 minutes. After boiling, the cooker mash is cooled to 172° F. utilizing the cooker vessel jacket. The malt mash which has been held at 95° F. is now pumped into the cooker. The cooker is heated while the malt mash is pumped in so as to maintain 172° F. during the entire period of the pumpover. After resting at this temperature for 20 minutes, the mash is pumped to lauter. Total mashing time is 2 hours and 40 minutes.

The mash is filtered and strained in a lauter tub or equivalent equipment, and the filtrate is collected in the brew kettle. The wort is boiled with 277 lbs. of hops under atmospheric pressure for about 90 minutes. At this time the wort has a solids content of about 14.5 degree Plato. After straining off the hops and settling out the trub, the wort is cooled and yeasted with approximately 1.5 lbs. of brewer's yeast per barrel of wort as it goes into fermenters. About 420 bbls of wort with a solids content of about 15.0 degree Plato and an RDF of 43% are obtained. When the apparent solids content reaches 9 3 degree Plato, the fermenting wort is transferred to a storage tank containing beechwood chips. The main fermentation and post fermentation (storage) run for a total of about 25 days. The beer is then removed from the beechwood chips, chill-proofed and blended with deaerated, carbonated water such that the alcohol is approximately 1.80% by weight and the calorie content is approximately 113 per 12 fluid ounce. The beer is then filtered and packaged and has the taste, aroma, mouth feel, foam stability, and appearance of beers of much higher alcohol content.

EXAMPLE NO. 2

18,930 lbs. of ground barley malt is mixed with 6,840 gal. of water at 115° F. in the mash tub. Simultaneously 5,160 lbs. of corn grits and 1,680 lbs. of ground barley malt are mixed with 2,880 gal. of water at 118° F. in a cooker. While the temperature in the mash tub remains at 115° F, the cooker mash is brought to boil and boiled for 20 minutes. After boiling, the cooker mash is cooled to 172° F. by the addition of 980 gal. of 40° F. brewing water. The malt mash which has been held at 115° F. is now pumped into the cooker. The cooker is heated while the malt mash is pumped in so as to maintain 172° F. during the entire period of the pumpover. After resting at this temperature for 20 minutes, the mash is pumped to lauter. Total mashing time is 2 hours and 5 minutes.

The mash is filtered and strained in a lauter tub or equivalent equipment, and the filtrate is collected in the brew kettle. The wort is boiled with 277 lbs. of hops under atmospheric pressure for about 90 minutes. At this time the wort has a solids content of about 14.5 degree Plato. After straining off the hops and settling out the trub, the wort is cooled and yeasted with approximately 1.5 lbs. of brewer's yeast per barrel of wort. About 420 bbls of wort with a solids content of about 15.0 degree Plato and an RDF of 43% are obtained. When the apparent solids content reaches 9.3 degree Plato, the fermenting wort is transferred to a storage tank containing beechwood chips. The main fermentation and post fermentation (storage) run for a total of about 25 days. The beer is then removed from the beechwood chips, chill-proofed and blended with de-aerated, carbonated water such that the alcohol is approximately 1.80% by weight and the calorie content is approximately 113 per 12 fluid ounce. The beer is then filtered and packaged and has the taste, aroma, mouth feel, foam stability, and appearance of beers of much higher alcohol content.

EXAMPLE NO. 3

8,460 lbs. of ground barley malt is mixed with 3,060 gal. of water at 115° F. in the mash tub. Simultaneously 12,600 lbs. of corn grits and 4,140 lbs. of ground barley malt are mixed with 6,030 gal. of water at 118° F. in a cooker. While the temperature in the mash tub remains at 115° F the cooker mash is brought to boil and boiled for 20 minutes. After boiling, the cooker mash is cooled to 172° F. by the addition of cold brewing water. The malt mash which has been held at 115° F. is now pumped into the cooker. The cooker is heated while the malt mash is pumped in so as to maintain 172° F. during the entire period of the pumpover. After resting at this temperature for 20 minutes, the mash is pumped to lauter. Total mashing time is 2 hours and 5 minutes.

The mash is filtered and strained in a lauter tub or equivalent equipment, and the filtrate is collected in the brew kettle. The wort is boiled with 277 lbs. of hops under atmospheric pressure for about 90 minutes. At this time the wort has a solids content of about 14.5 degree Plato. After straining off the hops and settling out the trub, the wort is cooled and yeasted with approximately 1.5 lbs. of brewer's yeast per barrel of wort. About 420 bbls of wort with a solids content of about 15.0 degree Plato and an RDF of 43% are obtained. When the apparent solids content reaches 9.3 degree Plato, the fermenting wort is transferred to a storage tank containing beechwood chips. The main fermentation and post fermentation (storage) run for a total of about 25 days. The beer is then removed from the beechwood chips, chill-proofed and blended with de-aerated, carbonated water such that the alcohol is approximately 1.80% by weight and the calorie content is approximately 113 per 12 fluid ounce. The beer is then filtered and packaged and has the taste, aroma, mouth feel, foam stability, and appearance of beers of much higher alcohol content.

EXAMPLE NO. 4

18,840 lbs. of ground barley malt is mixed with 6,360 gal. of water at 115° F. in the mash tub. While the temperature in the mash tub remains at 115° F, 3,450 gal. of water are put in the cooker and heated to 172° F. After the malt mash has been held at 115° F. for 105 minutes, it is pumped into the cooker water. The cooker water is heated while the malt mash is pumped in so as to maintain 172° F. during the entire period of the pumpover. After resting at this temperature for 20 minutes, the mash is pumped to lauter. Total mashing time is 2 hours and 20 minutes.

The mash is filtered and strained in a lauter tub or equivalent equipment, and the filtrate is collected in the brew kettle. The wort is boiled with 203 lbs. of hops under atmospheric pressure for about 90 minutes. At this time the wort has a solids content of about 10.5 degree Plato. After straining off the hops and settling out the trub, the wort is cooled and yeasted with approximately 1 lb. of brewer's yeast per barrel of wort. About 420 bbls of wort with a solids content of about 11.0 degree Plato and an RDF of 43% are obtained. When the apparent solids content reaches 6.8 degree Plato, the fermenting wort is transferred to a storage tank containing beechwood chips. The main fermentation and post fermentation (storage) run for a total of about 25 days. The beer is then removed from the beechwood chips, chill-proofed and blended with de-aerated, carbonated water such that the alcohol is approximately 1.80% by weight and the calorie content is approximately 113 per 12 fluid ounce. The beer is then filtered and packaged and has the taste, aroma, mouth feel, foam stability, and appearance of beers of much higher alcohol content.

EXAMPLE NO. 5

18,900 lbs. of ground barley malt is mixed with 6,944 gal of water at 118° F. in the mash tub. Simultaneously, 17,000 lbs of corn grits and 6,400 lbs. of ground barley malt are mixed with 8,246 gal. of water at 118° F. in a cooker. While the temperature in the mash tub remains at 118° F, the cooker mash is brought to boil and boiled for 20 minutes. After boiling, the cooker mash is cooled to 172° F. by the addition of cold brewing water. The malt mash which has been held at 118° F. is now pumped into the cooker. The cooker is heated while the malt mash is pumped in so as to maintain 172° F. during the entire period of the pumpover. After resting at this temperature for 20 minutes, the mash is pumped to lauter. Total mashing time is 2 hours and 10 minutes.

The mash is filtered and strained in a lauter tub or equivalent equipment, and the filtrate is collected in the brew kettle. The wort is boiled with 480 lbs. of hops under atmospheric pressure for about 90 minutes. At this time the wort has a solids content of about 14.5 degree Plato. After straining off the hops and settling out the trub, the wort is cooled and yeasted with approximately 1.5 lbs. of brewer's yeast per barrel of wort. About 690 bbls of wort with a solids content of about 15.0 degree Plato and an RDF of 43% are obtained. When the apparent solids content reaches 9.3 degree Plato, the fermenting wort is transferred to a storage tank containing beechwood chips. The main fermentation and post fermentation (storage) run for a total of about 25 days. The beer is then removed from the beechwood chips, chill-proofed and blended with de-aerated, carbonated water such that the alcohol is approximately 1.80% by weight and the calorie content is approximately 113 per 12 fluid ounce. The beer is then filtered and packaged and has the taste, aroma, mouth feel, foam stability, and appearance of beers of much higher alcohol content.

EXAMPLE NO. 6

25,300 lbs. of ground barley malt is mixed with 9,145 gal. of water at 118° F. in the mash tub. After 15 minutes at 118° F, 90 bbl of this mixture is pumped to the cooker where it is combined with 17,000 lbs. of corn grits and 6,045 gal. of water at 118° F. While the temperature in the mash tub remains at 118° F, the cooker mash is brought to boil and boiled for 20 minutes. After boiling, the cooker mash is cooled to 172° F. by the addition of cold brewing water. The malt mash which has been held at 118° F. is now pumped into the cooker. The cooker is heated while the malt mash is pumped in so as to maintain 172° F. during the entire period of the pumpover. After resting at this temperature for 20 minutes, the mash is pumped to lauter. Total mashing time is 2 hours and 10 minutes.

The mash is filtered and strained in a lauter tub or equivalent equipment, and the filtrate is collected in the brew kettle. The wort is boiled with 480 lbs. of hops under atmospheric pressure for about 90 minutes. At this time, the wort has a solids content of about 14.5 degree Plato. After straining off the hops and settling out the trub, the wort is cooled and yeasted with approximately 1.5 lbs. of brewer's yeast per barrel of wort. About 690 bbls of wort with a solids content of about 15.0 degree Plato and an RDF of 43% are obtained. When the apparent solids content reaches 9.3 degree Plato, the fermenting wort is transferred to a storage tank containing beechwood chips. The main fermentation and post fermentation (storage) run for a total of about 25 days. The beer is then removed from the beechwood chips, chill-proofed and blended with de-aerated, carbonated water such that the alcohol is approximately 1.80% by weight and the calorie content is approximately 113 per 12 fluid ounce. The beer is then filtered and packaged and has the taste, aroma, mouth feel, foam stability, and appearance of beers of much higher alcohol content.

Thus, it is seen that the foregoing application achieves all of the objects and advantages sought therefore. This application is intended to cover all changes and modifications and variations of the examples herein chosen for purposes of the disclosure of this invention which do not constitute departures from the spirit and scope of the invention.

What is claimed is:

1. A process for mashing to produce a wort of low fermentable sugar content but high carbohydrate content, comprising the steps of
   (a) forming a main mash,
   (b) maintaining the temperature of the main mash below the activity range for beta-amylase,
   (c) adding the main mash incrementally into a body of brewing liquid which is maintained at a temperature above the deactivation temperature of beta-amylase and below the deactivation temperature of alpha-amylase, at a rate such that the added main mash is substantially instantaneously raised to the temperature of the body of liquid to limit the conversing of starches by beta-amylase and other enzymes without significant loss of alpha-amylase from overheating, whereby, upon completion of mashing, the wort has a low real degree of fermentation of from about 40% to about 46%.

2. A process for mashing to produce a wort of low fermentable sugar content, but high carbohydrate content, comprising the steps of
   (a) forming a main mash,
   (b) forming a cooker mash,
   (c) maintaining the temperature of the main mash below the activity range for beta-amylase,
   (d) heating the cooker mash to boiling for a period of time sufficient to liquify the starch,
   (e) cooling the cooker mash to and thereafter maintaining it at a temperature above the deactivation temperature of beta-amylase and below the deactivation temperature of alpha-amylase, and
   (f) mixing the main mash incrementally into the cooker mash at a rate such that the added main mash is raised to the temperature of the cooker mash substantially instantaneously.

3. The process of claim 2 wherein the main mash in step (c) is at a temperature of about 95° F. to 120° F.

4. The process of claim 2 wherein the cooker mash is started at a temperature of about 95° F. to 160° F. and is raised to boiling and maintained there for a period of about 10 to about 30 minutes.

5. The process of claim 2 wherein the cooker mash is cooled in step (e) to a temperature of about 169° F. to about 174° before the main mash is added thereto.

6. The process of claim 5 wherein the cooker mash is cooled by adding cold water thereto.

7. The process of claim 2 wherein in step (f) the main mash is raised substantially instantaneously to a temperature of about 169° F. to 174° F. by mixing it into the cooker mash while maintaining the combined mash at a temperature of about 169° F. to about 174° F. with heating.

8. The process of claim 2 including the added step of holding the combined cooker and main mashes at a temperature of about 169° F. to about 174° F. for a time sufficient to achieve a conversion of sugars such that the wort has about 40% to about 46% real degree of fermentation.

9. The process of claim 2 including the added steps of fermenting the wort and recovering a beer of less than 2% alcohol by weight and having less than about 118 calories per 12 ounce serving.

10. A low alcohol beer containing less than 2% alcohol by weight and less than 118 calories per 12 ounce serving and having he taste, aroma, appearance, foam stability and mouth feel of a regular beer, said beer being produced by the process of claim 9.

11. The process of brewing a low alcohol, reduced calorie beer using the high gravity brewing principle, comprising the steps of
   (a) preparing a hopped, boiled wort, which after straining and cooling, has a gravity of about 10° to about 18° Plato,
   (b) preparing said hopped, boiled wort of about 10° to 18° Plato according to the process of claim 2,
   (c) combining the wort with yeast to ferment the wort to produce a fully attenuated fermented wort, (d) preparing a purified carbonated water by dissolving $CO_2$ from a beer fermentation in deaerated water, and (e) combining said carbonated water with the fermented wort from step(c) to produce a low alcohol, reduced calorie beer having a less than 2% alcohol by weight and having less than about 118 calories per 12 ounce serving.

12. A process for mashing to produce a wort of low fermentable sugar comprising the steps of (a) forming a main mash, (b) maintaining the temperature of the main mash below the activity range for beta-amylase, (c) providing only water in a cooker at a temperature above the activity range for beta-amylase and below the deactivation temperature of alpha-amylase and thereafter maintaining said temperature, and (d) mixing the main mash into the hot water in the cooker at a rate such that the added main mash is raised substantially instantaneously to the temperature of the water in the cooker.

13. The process of claim 12 wherein the main mash in step (b) is at a temperature of about 95° F. to 120° F.

14. The process of claim 12 wherein the cooker water is between about 169° F. to 174° F.

15. The process of claim 12 wherein the main mash is raised substantially instantaneously to a temperature of about 169° F. to 174° F. by mixing it into the water in the cooker while maintaining the cooker mixture temperature at about 169° F. to 174° F. during the period in which the main mash is added thereto.

16. The process of claim 12 including the step of holding the combined cooker water and main mash at about 169° F. to 174° F. for a time sufficient to achieve a conversion of sugars such that the wort has about 40% to about 46% real degree of fermentation.

17. The process of claim 12 including the added steps of fermenting the wort and recovering a beer of less than 2% alcohol by weight and having less than about 118 calories per 12 ounce serving.

18. A low alcohol beer containing less than 2% alcohol by weight and less than 118 calories per 12 ounce serving and having the taste, aroma, appearance, foam stability and mouth feel of a regular beer, said beer being produced by the process of claim 17.

19. The process of brewing a low alcohol, reduced calorie beer using the high gravity brewing principle, comprising the steps of (a) preparing a hopped, boiled wort, which after straining and cooling, has a gravity of about 10° to about 18° Plato, (b) preparing said hopped, boiled wort of about 10° to 18° Plato according to the process of claim 12, (c) combining the wort with yeast to ferment the wort to produce a fermented wort, (d) preparing a purified carbonated water by dissolving $CO_2$ from a beer fermentation in deaerated water, and (e) combining said carbonated water with the fermented wort from step (c) to produce a low alcohol reduced calorie beer having less than 2% alcohol by weight and having less than about 118 calories per 12 ounce serving.

20. A process for mashing to produce a wort of low fermentable sugar content but high carbohydrate content comprising the steps of (a) forming a main mash containing alpha-amylase and beta-amylase at a temperature of from about 95° F. to about 120° F., (b) forming a body of brewing liquid having a temperature range of about 169° F. to about 174° F., (c) substantially instantaneously raising the temperature of the mash to a temperature in the range of about 169° F. to about 174° F., above the deactivation temperature of beta-amylase, but below the deactivation temperature of alpha-amylase, and avoiding substantial heat destruction of the alpha-amylase, thereby substantially limiting the conversion of starches by beta-amylase and other enzymes, by admixing the main mash and the brewing liquid while maintaining the temperature of the admixture within the range of about 169° F. and to about 174° F., (d) completing the mashing at said temperature of about 169° F. to about 174° F., and (e) recovering wort upon completion of mashing having a real degree of fermentation between about 40% and 46%.

21. A process for mashing to produce a wort as defined in claim 20 wherein step (c) comprises pumping the main mashing to admixture with the brewing liquid.

22. A process as defined in claim 21 wherein the brewing liquid is water.

23. A process as defined in claim 21 wherein the brewing liquid is cooker mash.

24. A process for mashing to produce a wort of low fermentable sugar content but high carbohydrate content comprising the steps of (a) forming a main mash containing alpha-amylase and beta-amylase at a temperature of from about 95° F. to about 120° F., (b) forming a cooker mash, (c) boiling the cooker mash, (d) cooling the cooker mash to a temperature in the range of about 169° F. to about 174° F., (e) substantially instantaneously raising the temperature of the main mash to a temperature in the range of about 169° F. to about 174°, above the deactivation temperature of beta-amylase, but below the deactivation temperature of alpha-amylase and avoiding substantial heat destruction of the alpha-amylase, thereby substantially limiting the conversion of starches by beta-amylase and other enzymes by pumping the main mash into admixture with the cooker mash while maintaining the temperature of the admixture within the range of about 169° F. and 174° F., (f) completing the mashing at said temperature of about 169° F. to about 174° F., and (g) recovering wort upon completion of mashing having a real degree of fermentation between about 40% and about 46%.

25. A process for mashing to produce a wort as defined in claim 24 wherein the cooker mash is cooled to the temperature range of about 169° F. to about 174° F. by adding brewing water thereto.

* * * * *

UNITED STATES PATENT AND TRADEMARK OFFICE
CERTIFICATE OF CORRECTION

PATENT NO. : 5,021,246

DATED : June 4, 1991

INVENTOR(S) : Roger L. Sieben and Klaus D. Zastrow

It is certified that error appears in the above-identified patent and that said Letters Patent is hereby corrected as shown below:

Column 1, line 63, "foam," should be "foam".

Column 2, line 49, "a 115° F." should be "at 115° F.".

Column 2, line 62 "betaamylase" should be "beta-amylase".

Column 3, lines 20-21, "al-phaamylase" should be "alpha-amylase".

Column 4, line 17 "about °F." should be "about 120° F.".

Column 5, line 43, "115° F." should be "115° F.,".

Column 7, lines 51-52, "there-fore" should be "therefor".

Column 8, lines 2-3 "con-versing" should be "conversion".

Claim 10, column 8, line 56, "he taste" should be "the taste".

UNITED STATES PATENT AND TRADEMARK OFFICE
CERTIFICATE OF CORRECTION

PATENT NO. : 5,021,246

DATED : June 4, 1991

INVENTOR(S) : Roger L. Sieben and Klaus D. Zastrow

It is certified that error appears in the above-identified patent and that said Letters Patent is hereby corrected as shown below:

Claim 21, column 10, line 28, "to admixture" should be "into admixture".

Signed and Sealed this

Twenty-ninth Day of September, 1992

Attest:

DOUGLAS B. COMER

Attesting Officer

Acting Commissioner of Patents and Trademarks